(12) United States Patent
Amemiya

(10) Patent No.: US 11,060,565 B2
(45) Date of Patent: Jul. 13, 2021

(54) SCREW NUT

(71) Applicant: THK CO., LTD., Tokyo (JP)

(72) Inventor: Yohei Amemiya, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/759,821

(22) PCT Filed: Oct. 18, 2018

(86) PCT No.: PCT/JP2018/038798
§ 371 (c)(1),
(2) Date: Apr. 28, 2020

(87) PCT Pub. No.: WO2019/087794
PCT Pub. Date: May 9, 2019

(65) Prior Publication Data
US 2020/0347889 A1    Nov. 5, 2020

(30) Foreign Application Priority Data

Oct. 31, 2017  (JP) .............................. JP2017-210039

(51) Int. Cl.
*F16D 3/06* (2006.01)
*F16H 25/22* (2006.01)
*F16H 25/24* (2006.01)

(52) U.S. Cl.
CPC .......... *F16D 3/06* (2013.01); *F16H 25/2204* (2013.01); *F16H 25/24* (2013.01);
(Continued)

(58) Field of Classification Search
CPC ........ F16D 3/06; F16H 25/24; F16H 25/2204; Y10T 74/18632; Y10T 74/19772; Y10T 74/19749
(Continued)

(56) References Cited

U.S. PATENT DOCUMENTS

| 4,939,946 A | 7/1990 | Teramachi |
| 5,228,353 A | 7/1993 | Katahira et al. |

(Continued)

FOREIGN PATENT DOCUMENTS

| CN | 201021709 Y | 2/2008 |
| CN | 101594027 A | 12/2009 |

(Continued)

OTHER PUBLICATIONS

International Search Report, dated Oct. 18, 2018, from corresponding PCT application No. PCT/JP2018/038798.
(Continued)

*Primary Examiner* — Greg Binda
(74) *Attorney, Agent, or Firm* — Nixon & Vanderhye

(57) ABSTRACT

A screw nut on which a pulley is mounted is capable of promoting reductions in the size and weight thereof. The screw nut includes: an outer ring; and a nut rotatably assembled to the outer ring via a first rolling element. The nut includes: a nut body having a screw groove in an inner surface thereof; and a recirculation component provided at an end portion of the nut body in an axial direction, the recirculation component having a turn-around path for recirculating a second rolling element rolling along a screw groove. A pulley to be mounted on the nut is fitted on an outer surface of the nut body, and is brought into contact with an end surface of the nut in the axial direction. The pulley is mounted on the end surface of the nut with a fastening member.

2 Claims, 7 Drawing Sheets

(52) U.S. Cl.
CPC .... *Y10T 74/18632* (2015.01); *Y10T 74/19749* (2015.01); *Y10T 74/19772* (2015.01)

(58) Field of Classification Search
USPC ......... 474/25, 77; 180/444; 74/89.3, 424.82, 74/424.87; 464/168
See application file for complete search history.

(56) References Cited

U.S. PATENT DOCUMENTS

| | | | |
|---|---|---|---|
| 5,492,036 A * | 2/1996 | Sato | F16H 25/2219 |
| 6,382,039 B1 * | 5/2002 | Choi | B25J 18/025 |
| 7,870,806 B2 * | 1/2011 | Nishimura | F16H 25/2219 |
| | | | 74/424.82 |
| 2009/0133520 A1 | 5/2009 | Chen et al. | |
| 2009/0288511 A1 | 11/2009 | Kuribayashi et al. | |
| 2010/0098358 A1 | 4/2010 | Shirai | |
| 2010/0236345 A1 | 9/2010 | Miyahara et al. | |
| 2017/0072993 A1 | 3/2017 | Laszlo | |
| 2017/0259844 A1 | 9/2017 | Asakura et al. | |
| 2020/0122772 A1 * | 4/2020 | Suzuki | F16C 19/183 |

FOREIGN PATENT DOCUMENTS

| | | |
|---|---|---|
| CN | 202812032 U | 3/2013 |
| CN | 202914660 U | 5/2013 |
| CN | 204041907 U | 12/2014 |
| CN | 204300268 U | 4/2015 |
| CN | 204572986 U | 8/2015 |
| CN | 106536325 A | 3/2017 |
| CN | 107176202 A | 9/2017 |
| DE | 3814061 A1 | 9/1989 |
| DE | 41 42 983 A1 | 8/1992 |
| DE | 11 2008 002 867 T5 | 10/2012 |
| FR | 2628170 A1 | 9/1989 |
| GB | 2215428 A | 9/1989 |
| JP | H01-229160 A | 9/1989 |
| JP | H04-224351 A | 8/1992 |
| JP | 2003-340869 A | 12/2003 |
| JP | 2016-055738 A | 4/2016 |
| KR | 92-0007780 B1 | 9/1992 |
| KR | 20090085137 A | 8/2009 |

OTHER PUBLICATIONS

Office Action issued in Chinese Patent Application No. 201880069612.2 dated Sep. 1, 2020 with English translation provided.
Office Action issued in Korean Patent Application No. 10-2020-7015144 dated Sep. 1, 2020 with English translation provided.
Office Action issued in German Patent Application No. 11 2018 005 079.3 dated Feb. 19, 2021.

* cited by examiner

SCREW NUT

TECHNICAL FIELD

The present invention relates to a screw nut or a spline nut used for, for example, an actuator for an industrial robot.

BACKGROUND ART

A ball screw spline is used for a Z–θ actuator used for, for example, a tip shaft of a SCARA robot to meet demands for increases in functionality and precision. The ball screw spline includes a shaft, a screw nut assembled to the shaft, and a spline nut assembled to the shaft. A screw groove and a spline groove are formed on an outer surface of the shaft in such a manner as to overlap each other. A rotary input is provided to each of the screw nut and the spline nut to control the amount of rotation. Accordingly, the shaft performs arbitrary liner motion (Z), rotary motion (θ), and spiral motion (Z+θ).

The screw nut is a combination of a bearing and a ball screw nut in one. In other words, the screw nut includes an outer ring, and a screw nut rotatably assembled to the outer ring via a bearing ball. An inner ring of the bearing and the screw nut are integrated. The nut includes a nut body having a screw groove in an inner surface thereof, and a recirculation component having a turn-around path for recirculating screw balls rolling along the screw groove in the nut body.

The spline nut is a combination of a bearing and a ball spline nut in one. In other words, the spline nut includes an outer ring, and a nut rotatably assembled to the outer ring via a bearing ball. The nut includes a nut body having a spline groove in an inner surface thereof, and a recirculation component having a turn-around path for recirculating spline balls rolling along the spline groove.

Pulleys for rotating the screw nut and the spline nut are mounted on the screw nut and the spline nut, respectively. As a known pulley mounting method, Patent Literature 1 discloses a mounting method that provides a flange-shaped protrusion protruding in a radial direction integrally with an outer surface of a nut body, and fits a pulley on the outer surface of the nut body and brings the pulley into contact with the flange-shaped protrusion. The pulley is fitted on the outer surface of the nut body here; accordingly, the position of the pulley can be determined in the radial direction. Moreover, the pulley is brought into contact with the flange-shaped protrusion; accordingly, the position of the pulley can be determined in an axial direction.

Moreover, as another pulley mounting method, a mounting method is known which provides a recirculation component at an end portion of a nut body in an axial direction, provides an outside-diameter portion that protrudes in the axial direction in a ring shape in such a manner as to surround the recirculation component, integrally with the nut body, and fits the pulley on an outer surface of the nut body and brings the pulley into contact with the ring-shaped outside-diameter portion. The pulley is fitted on the outer surface of the nut body; accordingly, the position of the pulley can be determined in a radial direction. Moreover, the pulley is brought into contact with the ring-shaped outside-diameter portion; accordingly, the position of the pulley can be determined in the axial direction.

CITATION LIST

Patent Literature

Patent Literature 1: JP 4-224351 A

SUMMARY OF INVENTION

Technical Problem

In recent years, further reductions in the size and weight of the ball screw spline have been requested. This is because if reductions in the size and weight of the ball screw spline used for, for example, the tip shaft of a SCARA robot can be promoted, it is possible to move the SCARA robot at high speed and reduce the size of a motor.

However, in the pulley mounting method described in Patent Literature 1, the flange-shaped protrusion protruding in the radial direction is provided integrally with the outer surface of the nut body. Accordingly, there is a problem that the outside diameter of the nut is increased by the length required to provide the flange-shaped protrusion. Moreover, a return pipe as a recirculation component is provided on the outer surface of the nut body of the screw nut. Accordingly, there is also a problem that the outside diameter of the nut is increased by the length required to provide the return pipe.

In the above other pulley mounting method, the outside-diameter portion that protrudes in the axial direction in the ring shape in such a manner as to surround the recirculation component is provided integrally with the nut body. Accordingly, there is a problem that the outside diameter of the nut is increased by the length required for the presence of the ring-shaped outside-diameter portion. Moreover, a gap is created between the pulley and the recirculation component. Accordingly, there is also a possibility that the gap becomes a cause of the looseness of the pulley.

Hence, an object of the present invention is to provide a screw nut or a spline nut on which a pulley is mounted, the screw nut or the spline nut capable of promoting reductions in the size and weight thereof.

Solution to Problem

In order to solve the above problem, an aspect of the present invention is a screw nut or a spline nut including: an outer ring; and a nut rotatably assembled to the outer ring via a first rolling element, in which the nut has: a nut body having a screw groove or a spline groove in an inner surface thereof; and a recirculation component provided at an end portion of the nut body in an axial direction, the recirculation component having a turn-around path for recirculating a second rolling element rolling along the screw groove or the spline groove, a pulley to be mounted on the nut is fitted on an outer surface of the nut body, and is brought into contact with an end surface of the nut in the axial direction, and the pulley is mounted on the end surface of the nut with a fastening member.

Advantageous Effects of Invention

According to the present invention, the recirculation component is provided at the end portion of the nut body in the axial direction. Accordingly, the outside diameter of the nut can be reduced. Moreover, the pulley is brought into contact with the end surface of the nut in the axial direction, and is mounted on the end surface of the nut in the axial direction with the fastening member. Accordingly, it is possible to eliminate a gap between the pulley and the end surface of the nut and eliminate a cause of the looseness of the pulley. Furthermore, there is no need to provide a ring-shaped outside-diameter portion for bringing the pulley into contact with the nut body. Accordingly, the outside diameter of the nut can be further reduced.

DESCRIPTION OF EMBODIMENTS

A screw nut and a spline nut of an embodiment of the present invention are described in detail hereinafter with reference to the accompanying drawings. However, the screw nut and the spline nut of the present invention can be embodied in various modes, and are not limited to the embodiment described in the description. The embodiment is provided with the intention of enabling those skilled in the art to fully understand the scope of the invention by fully disclosing the description.

Figure 1:
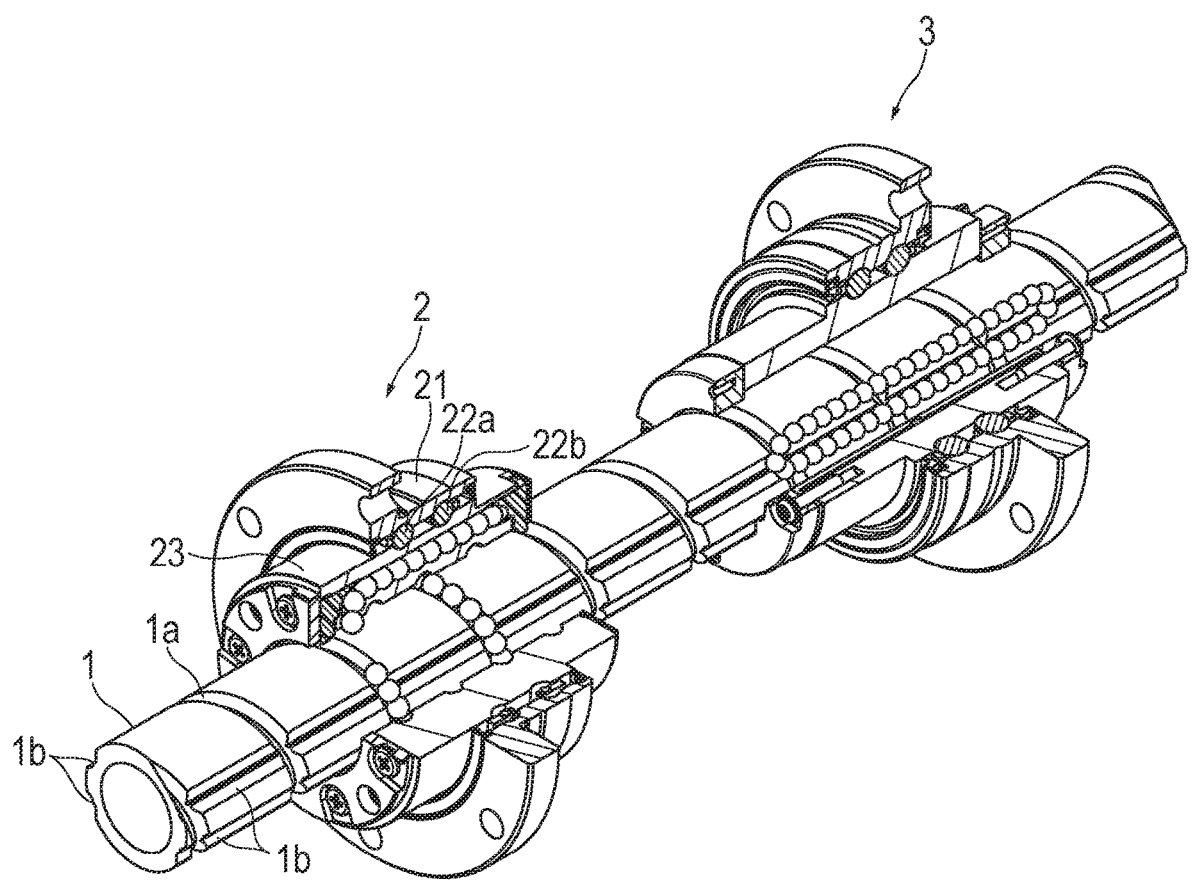
FIG. 1 is a perspective view of a ball screw spline where a screw nut and a spline nut of one embodiment of the present invention is integrated (an example where the screw nut is placed on the front side).
Figure 2:
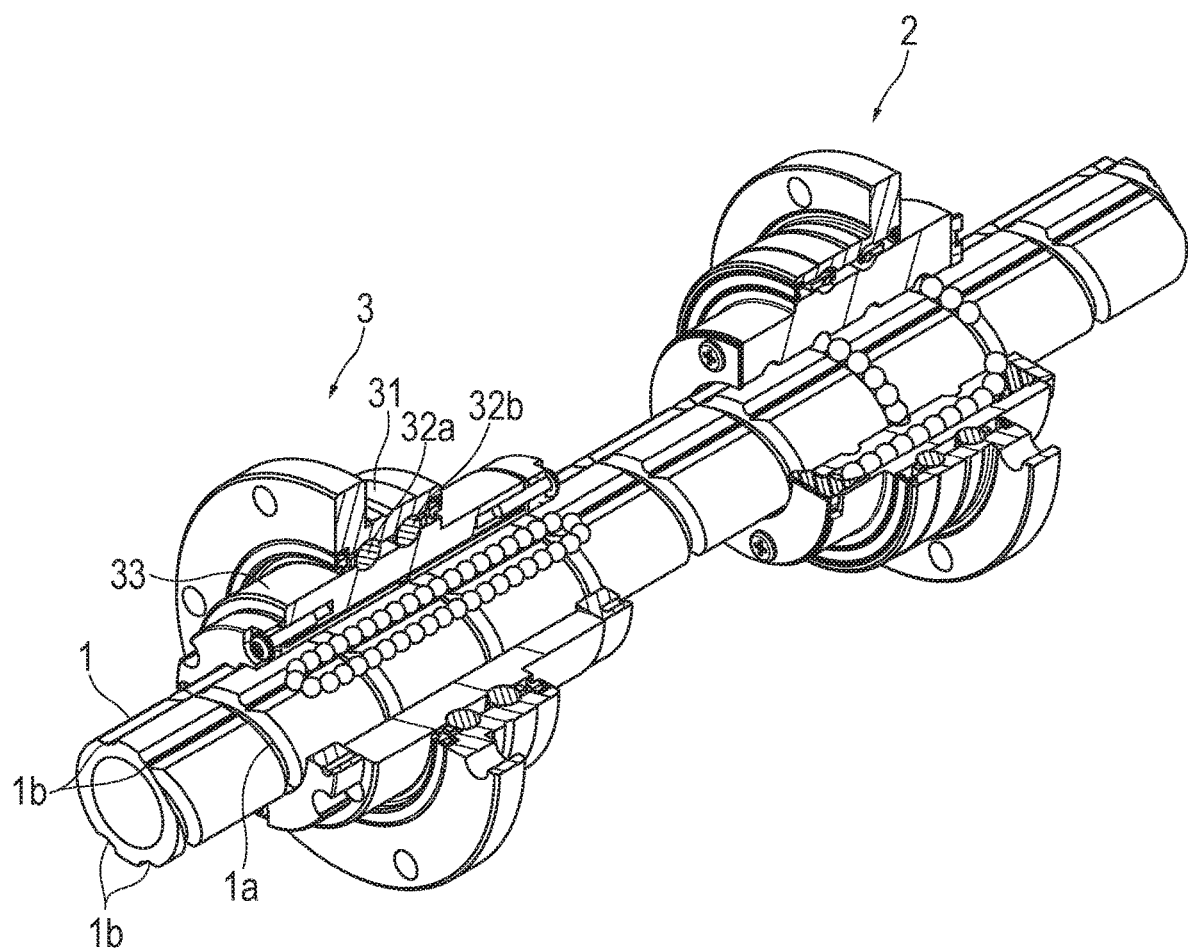
FIG. 2 is a perspective view of the ball screw spline where the screw nut and the spline nut of one embodiment of the present invention is integrated (an example where the spline nut is placed on the front side).

FIGS. 1 and 2 illustrate perspective views (partial cross-sectional views) of a ball screw spline where a screw nut and a spline nut of one embodiment of the present invention are integrated. FIG. 1 is an example where the screw nut is placed on the front side. FIG. 2 is an example where the spline nut is placed on the front side. In FIGS. 1 and 2, a reference sign 1 denotes a shaft, a reference sign 2 denotes the screw nut, and a reference sign 3 denotes the spline nut. They are described below in turn.

(Shaft)

As illustrated in FIG. 1, in an outer surface of the shaft 1, a helical screw groove 1a having a predetermined lead is formed, and a straight spline groove 1b extending in an axial direction is formed. The screw groove 1a and the spline groove 1b partially overlap with each other. The number of starts of the screw groove 1a of the embodiment is one and the number of starts of the spline groove 1b is four. Their numbers of starts are appropriately set.

(Screw Nut)

As illustrated in FIG. 1, the screw nut 2 is a combination of a bearing and a ball screw nut in one. In other words, the screw nut includes an outer ring 21, and a nut 23 rotatably assembled to the outer ring 21 via a plurality of bearing balls 22a and 22b as first rolling elements. An inner ring of the bearing and the nut 23 are integrated.

Figure 3:
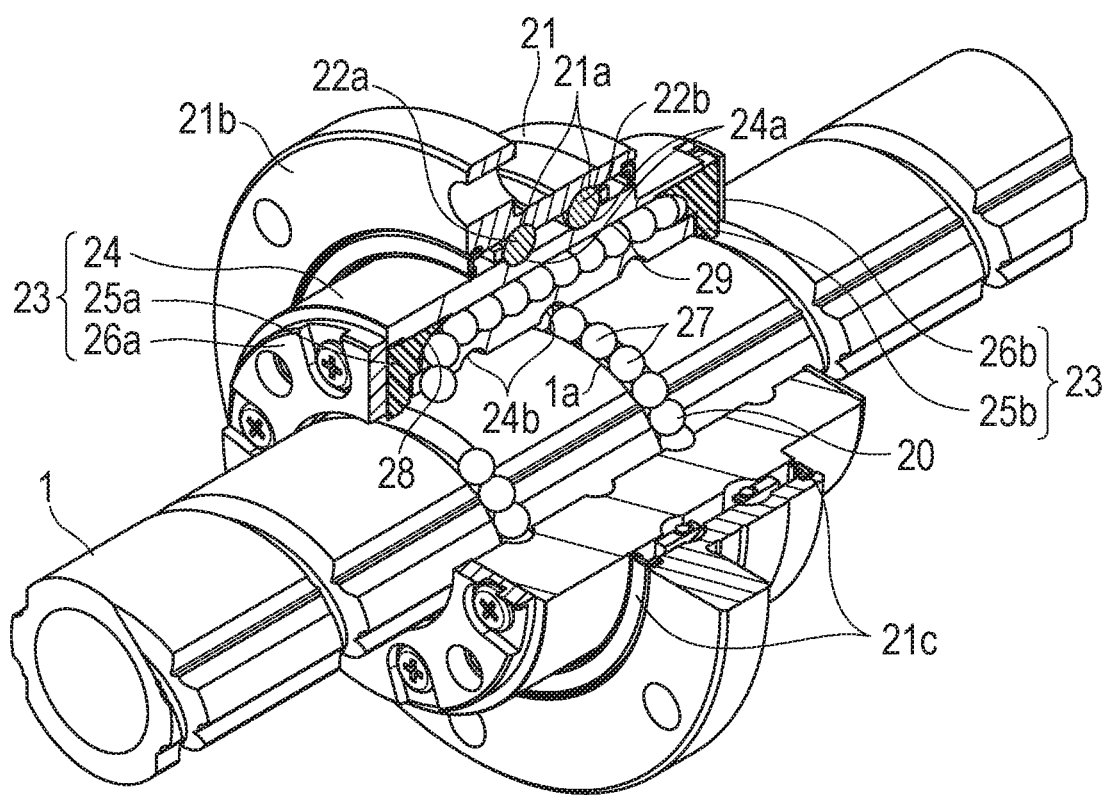
FIG. 3 is an enlarged perspective view of the screw nut of the embodiment and a shaft (a part of the screw nut is cut out).

As illustrated in an enlarged view of FIG. 3, the outer ring 21 has a substantially cylindrical shape and includes a flange 21b at one end portion in an axial direction of the outer ring 21. The outer ring 21 is mounted on, for example, a housing of a z-Θ actuator via the flange 21b. For example, a double-start outer ring groove 21a is formed in an inner surface of the outer ring 21. For example, a double-start inner ring groove 24a facing the outer ring groove 21a is formed in an outer surface of a nut body 24 of the nut 23. Two rows of the bearing balls 22a and 22b are disposed between the outer ring groove 21a and the inner ring groove 24a in such a manner as to be capable of rolling motion. The bearing balls 22a and 22b are held by a ring-shaped retainer. A seal 21c that blocks a gap between the outer ring 21 and the nut body 24 is mounted on the outer ring 21.

The nut 23 includes the tubular nut body 24, recirculation components 25a and 25b provided at end portions of the nut body 24 in the axial direction, and lid members 26a and 26b mounted on end surfaces of the nut body 24 in the axial direction. A helical screw groove 24b facing the screw groove 1a of the shaft 1 is formed in an inner surface of the nut body 24. A plurality of screw balls 27 as second rolling elements is placed between the screw groove 24b of the nut body 24 and the screw groove 1a of the shaft 1 in such a manner as to be capable of rolling motion. A turn-around path 28 for recirculating the screw balls 27 is formed in each of the recirculation components 25a and 25b. A through-hole 29 penetrating in the axial direction is formed in the nut body 24. The turn-around path 28 is connected to the screw groove 24b and the through-hole 29 of the nut body 24.

A loaded rolling path 20 between the screw groove 24b of the nut body 24 and the screw groove 1a of the shaft 1, the turn-around paths 28, and the through-hole 29 configure a recirculation path. The screw ball 27 that has moved to one end of the loaded rolling path 20 passes the turn-around path 28 of one recirculation component 25a, the through-hole 29, and the turn-around path 28 of the other recirculation component 25b, and then returns again to the other end of the loaded rolling path 20.

Figure 4:
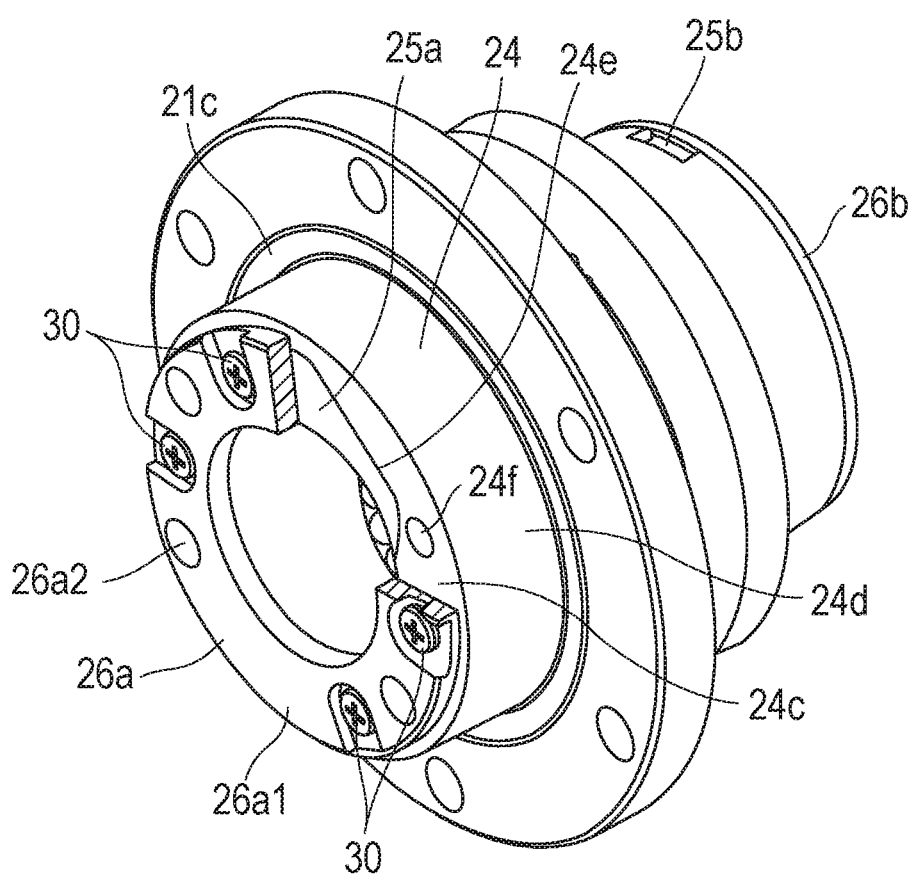
FIG. 4 is an enlarged perspective view of the screw nut of the embodiment (a part of a lid member is cut out).

As illustrated in FIG. 4, the recirculation components 25a and 25b are housed in recesses 24e in the end surfaces of the nut body 24 in the axial direction. The recirculation components 25a and 25b are fixed, covered with the ring-shaped lid members 26a and 26b. The recirculation components 25a and 25b are made of resin. The nut body 24 and the lid members 26a and 26b are made of metal. The lid members 26a and 26b cover substantially entire end surfaces 24c of the nut body 24 in the axial direction. The lid members 26a and 26b are fastened to the nut body 24 with fastening members 30 such as screws. Note that the outside diameter of the lid members 26a and 26b is slightly smaller than the outside diameter of the nut body 24. This is for making it easy to fit a pulley 41 described below on an outer surface 24d of the nut body 24.

Figure 5A:
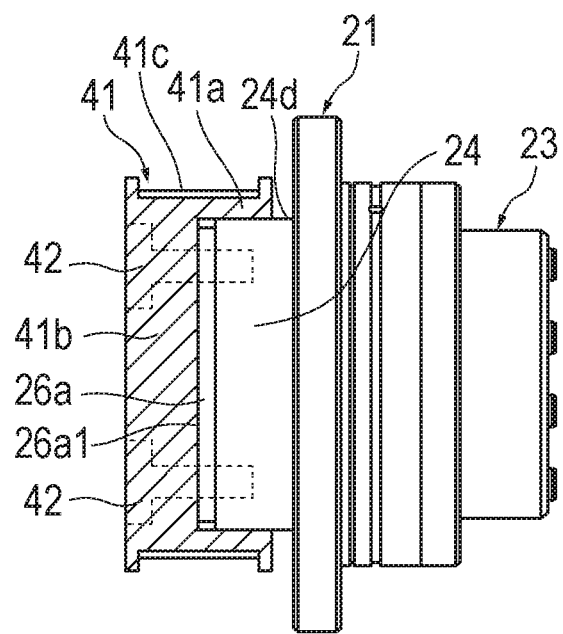
FIG. 5A is a side view illustrating a pulley mounting method of the embodiment.
Figure 5B:
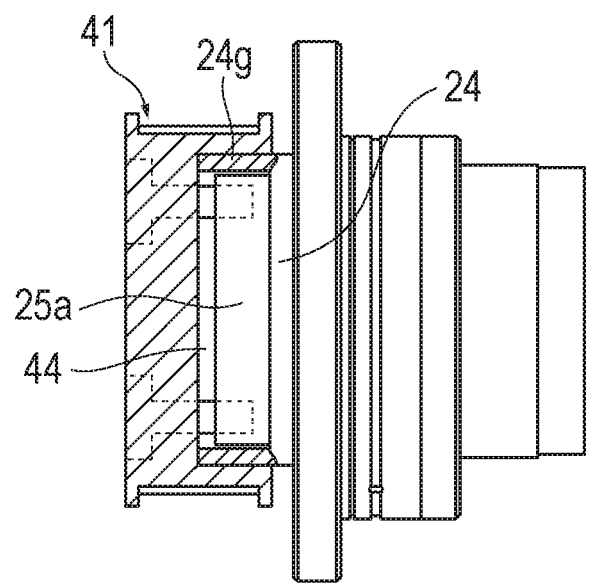
FIG. 5B is a side view illustrating a known pulley mounting method.

FIG. 5A illustrates a pulley mounting method of the embodiment. FIG. 5B illustrates a known pulley mounting method. The pulley 41 has a substantially bottomed cylindrical shape, and includes a cylindrical portion 41a and a bottom portion 41b. A plurality of teeth 41c that meshes with a timing belt is formed on an outer surface of the cylindrical portion 41a. The pulley 41 is made of metal such as aluminum.

As illustrated in FIG. 5A, the pulley 41 is fitted on an outer surface 24d of the nut body 24, and is brought into contact with an end surface 26a1 of the lid member 26a in the axial direction, that is, the end surface 26a1 of the nut 23 in the axial direction. More specifically, the cylindrical portion 41a of the pulley 41 is fitted on the outer surface 24d of the nut body 24 with a predetermined fit, and the bottom portion 41b of the pulley 41 is brought into contact with the end surface 26a1 of the lid member 26a. The pulley 41 is fitted on the outer surface 24d of the nut body 24 to allow determining the position of the pulley 41 in a radial direction. The pulley 41 is brought into contact with the end surface 26*a*1 of the lid member 26*a* to allow determining the position of the pulley 41 in the axial direction. After the position is determined in the radial and axial directions, the pulley 41 is fastened to the nut body 24 with a fastening member 42 such as a bolt. A screw hole 24*f* (refer to FIG. 4) that threadedly engages with the fastening member 42 is formed in the nut body 24. A through-hole 26*a*2 (refer to FIG. 4) or a notch through which the fastening member 42 is threaded is formed in the lid member 26*a*.

The nut body 24 and the lid member 26*a* are made of metal. Accordingly, the pulley 41 can be fixed firmly to the nut 23. Moreover, substantially the entire end surface 26*a*1 of the nut 23 comes into contact with the pulley 41. Accordingly, a gap between the pulley 41 and the end surface 26*a*1 of the nut 23 can be eliminated. Consequently, it becomes possible to control the fastening torque of the fastening member 42 and eliminate a cause of looseness.

As illustrated in FIG. 5B, in the known pulley mounting method, an outside-diameter portion 24*g* that protrudes in the axial direction in a ring shape in such a manner as to surround the recirculation component 25*a* is provided integrally with the nut body 24 to prevent the resin recirculation component 25*a* from coming into contact with the pulley 41. The pulley 41 is brought into contact with the outside-diameter portion 24*g*. However, the outside diameter of the nut body 24 is increased by the length required to provide the outside-diameter portion 24*g*. The diameter of the pulley 41 is also increased. Moreover, a gap 44 is also created between the pulley 41 and the recirculation component 25*a*. Accordingly, the gap 44 may become a cause of the looseness of the pulley 41.

(Spline Nut)

As illustrated in FIG. 2, the spline nut 3 is a combination of a bearing and a ball spline nut in one. In other words, the spline nut 3 includes an outer ring 31, and a nut 33 rotatably assembled to the outer ring 31 via a plurality of bearing balls 32*a* and 32*b* as the first rolling elements. An inner ring of the bearing and the nut 33 are integrated.

Figure 6:
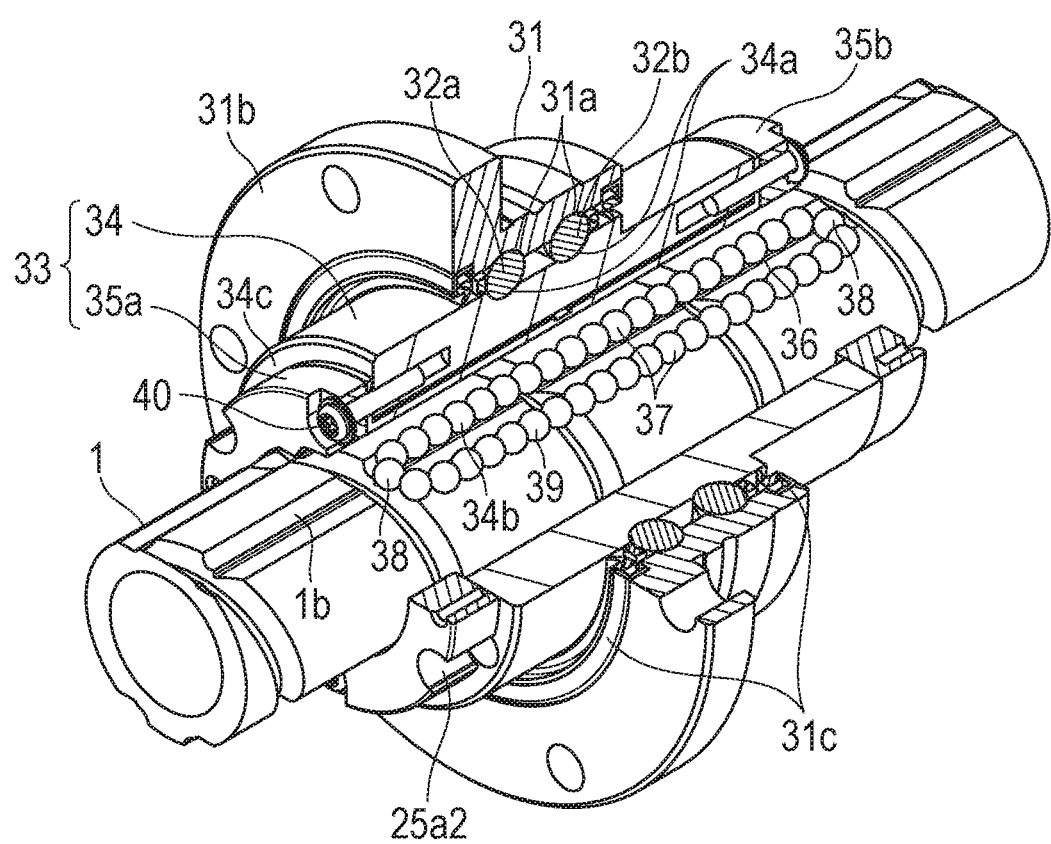
FIG. 6 is an enlarged perspective view of the spline nut of the embodiment.

As illustrated in an enlarged view of FIG. 6, the outer ring 31 has a substantially cylindrical shape and includes a flange 31*b* at one end portion in an axial direction of the outer ring 31. The outer ring 31 is mounted on, for example, a housing of a z-O actuator via the flange 31*b*. For example, a double-start outer ring groove 31*a* is formed in an inner surface of the outer ring 31. For example, a double-start inner ring groove 34*a* facing the outer ring groove 31*a* is formed in an outer surface of a nut body 34. Two rows of the bearing balls 32*a* and 32*b* are disposed between the outer ring groove 31*a* and the inner ring groove 34*a* in such a manner as to be capable of rolling motion. The bearing balls 32*a* and 32*b* are held by a ring-shaped retainer. A seal 31*c* that blocks a gap between the outer ring 31 and the nut body 34 is mounted on the outer ring 31.

The nut 33 includes the tubular nut body 34, and recirculation components 35*a* and 35*b* provided at end portions of the nut body 34 in the axial direction. A straight spline groove 34*b* that faces the spline groove 1*b* of the shaft 1 and extends in the axial direction is formed in an inner surface of the nut body 34 (FIG. 6 illustrates a row of balls rolling along the spline groove 34*b*, but the spline groove 34*b* is formed in the inner surface of the nut body 34). A plurality of spline balls 37 as the second rolling elements is placed between the spline groove 34*b* of the nut body 34 and the spline groove 1*b* of the shaft 1 in such a manner as to be capable of rolling motion. A U-shaped turn-around path 38 for recirculating the spline balls 37 is formed in each of the recirculation components 35*a* and 35*b*. FIG. 6 illustrates the balls moving through the U-shaped turn-around paths 38, but the turn-around paths 38 are formed in the recirculation components 35*a* and 35*b*. Moreover, a straight return path 39 parallel to the spline groove 34*b* is provided in the nut body 34. FIG. 6 illustrates the balls moving along the return path 39, but the return path 39 is provided in the nut body 34. The return path 39 is formed in the nut body 34 or a cage mounted on the nut body 34. The turn-around path 38 is connected to the spline groove 34*b* and the return path 39 of the nut body 34.

A loaded rolling path 36 between the spline groove 34*b* of the nut body 34 and the spline groove 1*b* of the shaft 1, the turn-around paths 38, and the return path 39 configure a recirculation path. The spline ball 37 that has moved to one end of the loaded rolling path 36 passes the turn-around path 38 of one recirculation component 35*a*, the return path 39, and the turn-around path 38 of the other recirculation component 35*b*, and then returns again to the other end of the loaded rolling path 36.

The recirculation components 35*a* and 35*b* are mounted on end surfaces 34*c* of the nut body 34 in the axial direction. The recirculation components 35*a* and 35*b* are made of metal, and are manufactured by, for example, MIM (Metal Injection Molding). The recirculation components 35*a* and 35*b* have a ring shape, and cover substantially the entire end surfaces 34*c* of the nut body 34. The outside diameter of the recirculation components 35*a* and 35*b* is slightly smaller than the outside diameter of the nut body 34. This is for making it easy to fit the pulley 41 described below on an outer surface of the nut body 34. The recirculation components 35*a* and 35*b* are fastened to the nut body 34 with fastening members 40 such as screws.

Figure 7A:
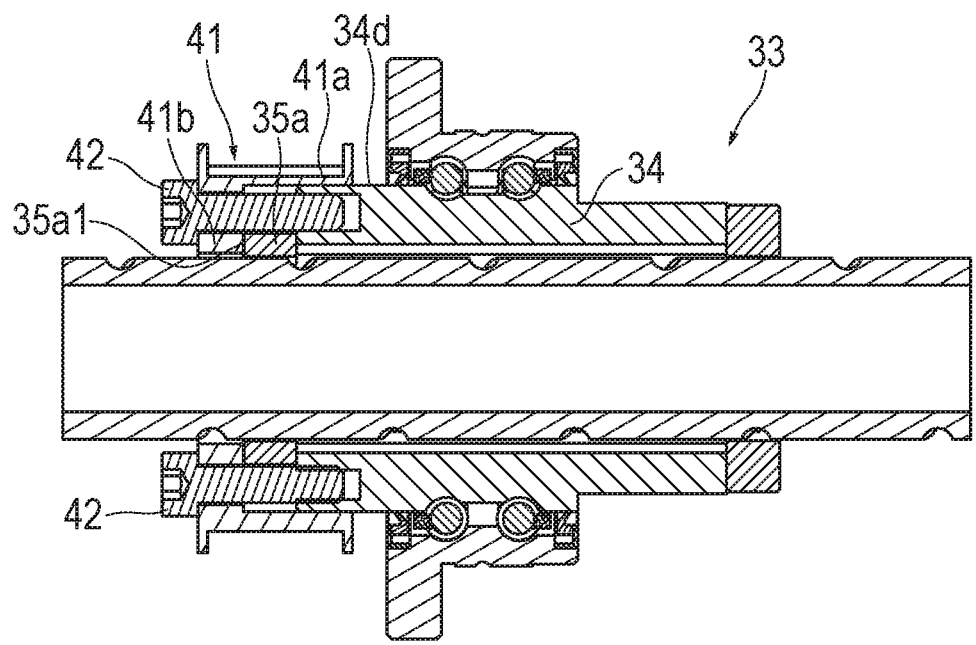
FIG. 7A is a cross-sectional view illustrating the pulley mounting method of the embodiment.
Figure 7B:
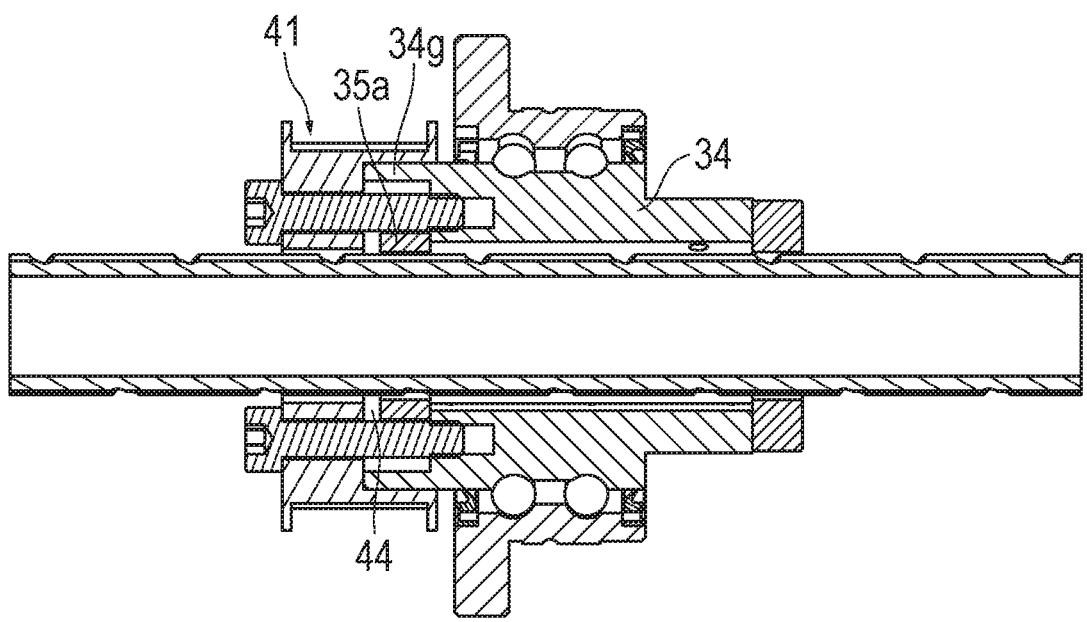
FIG. 7B is a cross-sectional view illustrating the known pulley mounting method.

FIG. 7A illustrates a pulley mounting method of the embodiment. FIG. 7B illustrates a known pulley mounting method. The pulley 41 is the same as the pulley 41 mounted on the screw nut 2. Accordingly, the same reference signs are assigned thereto, and a description thereof is omitted.

As illustrated in FIG. 7A, the pulley 41 is fitted on an outer surface 34*d* of the nut body 34, and is brought into contact with an end surface 35*a*1 of the recirculation component 35*a* in the axial direction, that is, the end surface 35*a*1 of the nut 33 in the axial direction. More specifically, the cylindrical portion 41*a* of the pulley 41 is fitted on the outer surface 34*d* of the nut body 34 with a predetermined fit, and the bottom portion 41*b* of the pulley 41 is brought into contact with the end surface 35*a*1 of the nut 33. The pulley 41 is fitted on the outer surface 34*d* of the nut body 34 to allow determining the position of the pulley 41 in the radial direction. The pulley 41 is brought into contact with the end surface 35*a*1 of the nut 33 to allow determining the position of the pulley 41 in the axial direction. After the position is determined in the radial and axial directions, the pulley 41 is fastened to the nut body 34 with the fastening member 42 such as a bolt. A screw hole that threadedly engages with the fastening member 42 is formed in the nut body 34. A through-hole or a notch 25*a*2 (refer to FIG. 6) through which the fastening member 42 is threaded is formed in the recirculation component 35*a*.

The nut body 34 and the recirculation component 35*a* are made of metal. Accordingly, the pulley 41 can be fixed firmly to the nut 33. Moreover, substantially the entire end surface 35*a*1 of the nut 33 comes into contact with the pulley 41. Accordingly, a gap between the pulley 41 and the end surface 35*a*1 of the nut 33 can be eliminated. Consequently, it becomes possible to control the fastening torque of the fastening member 42 and eliminate the cause of looseness.

As illustrated in FIG. 7B, in the known pulley mounting method, an outside-diameter portion 34g, which protrudes in the axial direction in a ring shape in such a manner as to surround the recirculation component 35a, is provided integrally with the nut body 34 to prevent the resin recirculation component 35a from coming into contact with the pulley 41. The pulley 41 is brought into contact with the outside-diameter portion 34g. However, the outside diameter of the nut body 34 is increased by the length required to provide the outside-diameter portion 34g. The diameter of the pulley 41 is also increased. Moreover, the gap 44 is created between the pulley 41 and the recirculation component 35a. Accordingly, there is also a possibility that the gap 44 becomes a cause of the looseness of the pulley 41.

Effects of the Screw Nut and Spline Nut of Embodiment

The recirculation components 25a and 35a are provided at the end portions of the nut bodies 24 and 34 in the axial direction. Accordingly, the outside diameters of the nuts 23 and 33 can be reduced. Moreover, the pulleys 41 are brought into contact with the end surfaces 26a1 and 35a1 of the nuts 23 and 33 in the axial direction, and are mounted with the fastening members 42 on the end surfaces 26a1 and 35a1 of the nuts 23 and 33 in the axial direction. Accordingly, it is possible to eliminate the gaps between the pulleys 41 and the end surfaces 26a1 and 35a1 of the nuts 23 and 33 and eliminate the cause of the looseness of the pulleys 41. Furthermore, there is no need to provide the nut bodies 24 and 34 with the ring-shaped outside-diameter portions 24g and 34g surrounding the recirculation components 25a and 35a. Accordingly, the outside diameters of the nuts 23 and 33 can be further reduced.

The pulleys 41 are brought into contact with the end surfaces 26a1 and 35a1 of metal components (for example, the lid member 26a and the recirculation component 35a) mounted on the nut bodies 24 and 34. Accordingly, the pulleys 41 can be fixed firmly to the nuts 23 and 33.

The resin recirculation component 25a of the screw nut 2 is housed in the recess 24e in the end surface 24c of the nut body 24. The recirculation component 25a is covered with the metal lid member 26a. Accordingly, there is no need to dispose the resin recirculation component 25a between the pulley 41 and the nut body 24, and the pulley 41 can be fixed firmly to the nut 23.

The recirculation component 35a of the nut 33 of the spline nut 3 is made of metal. Accordingly, the pulley 41 can be fixed firmly to the nut 33.

The present invention is not limited to the realization of the above embodiment, and can be modified to other embodiments within the scope that does not change the spirit of the present invention.

In the screw nut of the above embodiment, the pulley is brought into contact with the lid member. However, it is also possible to omit the lid member and bring the pulley into contact with the end surface of the nut body.

In the screw nut of the above embodiment, the pulley is brought into contact with the lid member. However, it is also possible to dispose an optional component such as a seal or lubricant supply apparatus including a metal body portion between the pulley and the lid member and bring the pulley into contact with the metal optional component.

In the screw nut of the above embodiment, the lid member is mounted on the end surface of the nut body. However, it is also possible to dispose an optional component such as a seal including a metal body portion between the lid member and the end surface. Moreover, it is also possible to cause the lid member to have the function of an optional component such as a seal.

In the spline nut of the above embodiment, the pulley is brought into contact with the recirculation component. However, it is also possible to dispose an optional component such as a seal or lubricant supply apparatus including a metal body portion between the pulley and the recirculation component and bring the pulley into contact with the metal optional component.

The description is based on Japanese Patent Application No. 2017-210039 filed on Oct. 31, 2017, the entire contents of which are incorporated herein.

REFERENCE SIGNS LIST

1 Shaft
1a Screw groove
1b Spline groove
2 Screw nut
3 Spline nut
21, 31 Outer ring
22a, 22b, 32a, 32b Bearing ball (first rolling element)
23, 33 Nut
24, 34 Nut body
24b Screw groove
24d, 34d Outer surface of the nut body
24e Recess
24g, 34g Outside-diameter portion
25a, 25b, 35a, 35b Recirculation component
26a, 26b Lid member
26a1, 35a1 End surface of the nut
27 Screw ball (second rolling element)
28, 38 Turn-around path
34b Spline groove
37 Spline ball (second rolling element)
41 Pulley
42 Fastening member

The invention claimed is:
1. A screw nut comprising:
an outer ring; and
a nut rotatably assembled to the outer ring via a first rolling element, the nut including
a nut body having a screw groove in an inner surface thereof,
a recirculation component provided at an end portion of the nut body in an axial direction, the recirculation component having a turn-around path for recirculating a second rolling element rolling along the screw groove, and
a metal component mounted on an end surface of the nut body in the axial direction, the metal component including a metal lid member covering the recirculation component housed in a recess in the end surface of the nut body in the axial direction and being in contact with an end surface of the nut body in the axial direction,
wherein an outer diameter surface of the nut body is configured to receive a pulley mounted thereon, the pulley being brought into contact with an end surface of the metal component and being mounted on the end surface of the metal component with a fastening member screwed in the nut body.

2. The screw nut according to claim 1, wherein an outside diameter of the lid member is smaller than an outside diameter of the nut body.

\* \* \* \* \*